(12) United States Patent
Lundell et al.

(10) Patent No.: US 10,245,796 B2
(45) Date of Patent: Apr. 2, 2019

(54) CENTER DECK ASSEMBLY FOR TIRE BUILDING DRUM

(71) Applicant: The Goodyear Tire & Rubber Company, Akron, OH (US)

(72) Inventors: Dennis Alan Lundell, Akron, OH (US); Douglas Raymond Weaver, Uniontown, OH (US); Mark John Montgomery, Rootstown, OH (US); Kenneth Dean Conger, Stow, OH (US); Kristian Daniel Johnson, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/218,164

(22) Filed: Jul. 25, 2016

(65) Prior Publication Data

US 2018/0022048 A1     Jan. 25, 2018

(51) Int. Cl.
*B29D 30/20* (2006.01)
*B29D 30/24* (2006.01)
(Continued)

(52) U.S. Cl.
CPC ......... *B29D 30/20* (2013.01); *B29D 30/0016* (2013.01); *B29D 30/24* (2013.01); *B29D 30/245* (2013.01); *B29D 30/10* (2013.01); *B29D 2030/0631* (2013.01); *B29D 2030/265* (2013.01); *B29D 2030/2657* (2013.01)

(58) Field of Classification Search
CPC .......................... B29D 30/00; B29D 30/0016; B29D 30/0661; B29D 30/10; B29D 30/12; B29D 30/20; B29D 30/24; B29D 30/247; B29D 2030/202; B29D 2030/3264;
(Continued)

(56) References Cited

U.S. PATENT DOCUMENTS

| 2,042,498 A | 6/1936 | Bostwick |
| 2,504,511 A * | 4/1950 | Ernst ...................... B60B 15/00 280/11 |

(Continued)

FOREIGN PATENT DOCUMENTS

| CN | 1157212 A * | 8/1997 |
| SU | 483279 A2 * | 9/1975 |

OTHER PUBLICATIONS

Katsumi Mori (CN 1157212, Aug. 20, 1997, machine translation).*
Balashov, SU 483279, machine translation. (Year: 1975).*
EPO search report received by Applicant dated Nov. 29, 2017.

*Primary Examiner* — Robert C Dye
*Assistant Examiner* — Sedef E Paquette
(74) *Attorney, Agent, or Firm* — Edward T. Kennedy

(57) ABSTRACT

The invention is directed to a center deck assembly for a tire building drum. The tire building drum is rotatably mounted on a central drive shaft and includes a center section. The center deck assembly is disposed in the center section of the drum and includes a hub that seats on and is secured to the central drive shaft. At least one piston extends circumferentially in the tire building drum about the hub and a plurality of segment bars are disposed about the circumference of the center deck assembly. The at least one piston is operably connected to the segment bars by a plurality of linkages, in which each of the linkages includes a scissor-lever mechanism.

13 Claims, 6 Drawing Sheets

(51) Int. Cl.
*B29D 30/00* (2006.01)
*B29D 30/26* (2006.01)
*B29D 30/10* (2006.01)
*B29D 30/06* (2006.01)

(58) Field of Classification Search
CPC ...... B29D 2030/0631; B29D 2030/265; B29D 2030/2657; B30B 1/10; B30B 1/16
USPC ..... 156/417, 414, 415, 420, 394.1; 248/421; 72/451
See application file for complete search history.

(56) References Cited

U.S. PATENT DOCUMENTS

| | | | |
|---|---|---|---|
| 2,583,650 A | 1/1952 | Hodgkins | |
| 3,366,526 A | 1/1968 | Winslow | |
| 3,547,733 A | 12/1970 | Leblond | |
| 3,816,218 A * | 6/1974 | Felten | B29D 30/32 156/398 |
| 3,867,229 A * | 2/1975 | Marra | B29D 30/24 156/415 |
| 4,007,081 A | 2/1977 | Mallory | |
| 4,126,507 A | 11/1978 | Kim et al. | |
| 4,220,494 A | 9/1980 | Kawaida et al. | |
| 4,239,579 A * | 12/1980 | Felten | B29D 30/247 156/132 |
| 4,425,180 A | 1/1984 | Samokhvalov et al. | |
| 4,469,546 A * | 9/1984 | Klose | B29D 30/2607 156/406.2 |
| 4,510,012 A | 4/1985 | Kawaida et al. | |
| 4,521,269 A | 6/1985 | Ozawa | |
| 4,614,562 A | 9/1986 | Jones | |
| 5,426,990 A * | 6/1995 | Francart, Jr. | F04B 9/06 137/445 |
| 5,505,803 A | 4/1996 | Byerley | |
| 6,013,147 A | 1/2000 | Byerley | |
| 6,880,603 B2 | 4/2005 | Akiyama | |
| 7,287,568 B2 | 10/2007 | Roedseth et al. | |
| 7,288,160 B2 | 10/2007 | Roedseth et al. | |
| 7,704,344 B2 | 4/2010 | Iyanagi et al. | |
| 8,511,359 B2 | 8/2013 | Perlman | |
| 2013/0152660 A1* | 6/2013 | Frey | B29C 51/38 72/379.2 |
| 2014/0048212 A1 | 2/2014 | Weaver et al. | |
| 2015/0114571 A1* | 4/2015 | Weaver | B29D 30/245 156/415 |

* cited by examiner

CENTER DECK ASSEMBLY FOR TIRE BUILDING DRUM

FIELD OF THE INVENTION

The invention relates to pneumatic tires, and more particularly, to equipment for the manufacture of tires known as tire building drums. Specifically, the invention is directed to an improved center deck assembly for a tire building drum.

BACKGROUND OF THE INVENTION

In the manufacture of a tire, the tire is typically built on the drum of a tire-building machine, which is known in the art as a tire building drum. Numerous tire components are wrapped about and/or applied to the drum in sequence, forming a cylindrical shaped tire carcass. The tire carcass is then expanded into a toroidal shape for receipt of the remaining components of the tire such as the belt package and a rubber tread. The completed toroidally-shaped unvulcanized tire carcass, which is known in the art as a green tire, is then inserted into a mold or press for forming of the tread pattern and curing or vulcanization.

In the tire building process, it may be difficult to precisely locate and anchor the tire beads on the unvulcanized tire carcass. If such locating and/or anchoring issues arise, there may be variations in the bead positioning, which may undesirably result in ply distortion in the tire. Therefore, it is desirable to precisely locate and anchor the tire beads on the unvulcanized tire carcass, which is known in the art as maintaining a positive bead lock, during the tire building process so that ply distortion is minimized and tire uniformity is optimized. It is desirable for both sides of the tire building drum to move in synchronization to maintain a positive bead lock to minimize ply distortion and optimize tire uniformity.

Typically the inner liner, one or more plies and possibly other components are wrapped onto the tire building drum while the drum is in a collapsed state, before the beads are applied. The beads are then located axially on the drum and the areas of the drum under the beads, known as bead locks, are expanded radially to fix the rest of the tire to the beads. The beads are then moved closer together by axial contraction of the drum, while the area of the drum between the beads, known as the center deck, is expanded to form a shoulder to help anchor the beads and provide a surface to apply subsequent components. Such expansion of the center deck of the tire building drum is referred to as crowning.

It is desirable that a crown, which is the radial difference between the expanded diameter of the center deck and the nominal tire bead diameter, be sufficiently large to enable subsequent components to be applied near their final shape and size. A large crown minimizes distortion when the tire is shaped during the remaining tire building and curing steps. It is thus desirable to provide as high a crown as possible to reduce distortion of the tire components. In the prior art, a maximum crown of about 0.7 inches has been typical, but it is desirable to achieve a crown of up to about 2.25 inches. While a larger or higher crown is desirable to minimize distortion during the tire building process, it is difficult to provide a tire building drum that is able to radially contract to the needed diameter while also being able to radially expand to such a high crown distance. In addition, because expansion forces increase with a larger crown, the force that is required to achieve such a high crown is also increased, which is difficult to achieve when the drum must contract to a compact diameter.

Therefore, it is desirable to provide a tire building drum with a center deck assembly that enables a high crown diameter of up to about 2.25 inches to be achieved.

SUMMARY OF THE INVENTION

According to an aspect of an exemplary embodiment of the invention, a center deck assembly is incorporated into a tire building drum. The tire building drum is rotatably mounted on a central drive shaft and includes a center section. The center deck assembly is disposed in the center section of the drum and includes a hub that seats on and is secured to the central drive shaft. At least one piston extends circumferentially in the tire building drum about the hub and a plurality of segment bars are disposed about the circumference of the center deck assembly. The at least one piston is operably connected to the segment bars by a plurality of linkages, in which each of the linkages includes a scissor-lever mechanism.

BRIEF DESCRIPTION OF DRAWINGS

The invention will be described by way of example and with reference to the accompanying drawings, in which.

Similar numerals refer to similar parts throughout the drawings.

DETAILED DESCRIPTION OF THE INVENTION

It is to be understood that the term axially inward or inwardly refers to an axial direction that is toward the axial center of the center deck assembly, which corresponds to the axial location of the guide posts, and the term axially outward or outwardly refers to an axial direction that is away from the axial center of the center deck assembly. The term radially inward or inwardly refers to a radial direction that is toward the central axis of rotation of the center deck assembly and the tire building drum, and the term radially outward or outwardly refers to a radial direction that is away from the central axis of rotation of the center deck assembly and the tire building drum.

Figure 1:
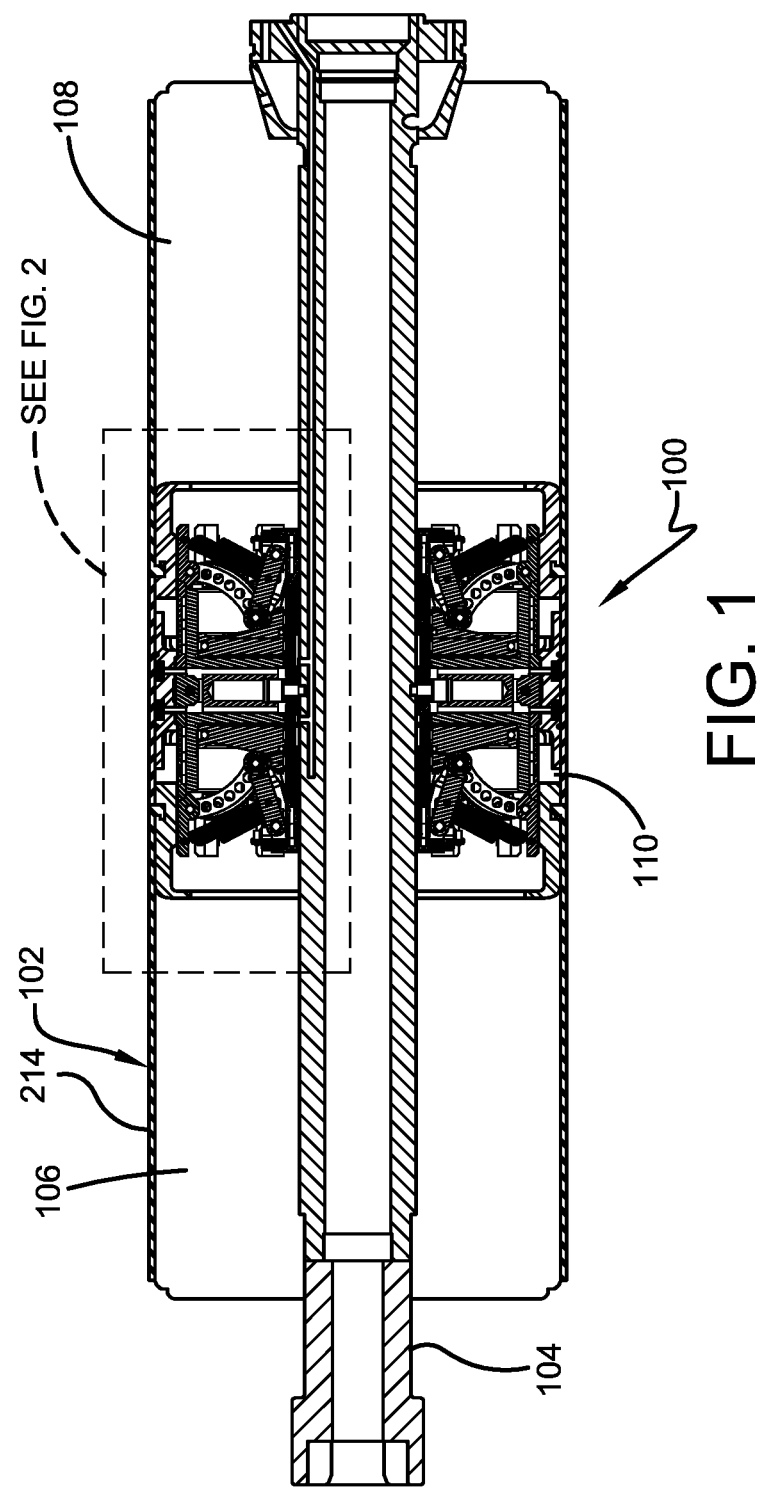
FIG. 1 is a cross-sectional view of a tire building drum including an exemplary embodiment of the center deck assembly of the present invention, with the general structure of the tire building drum being schematically represented for reference.

An exemplary embodiment of the center deck assembly of the present invention is indicated generally at 100, and is shown in FIG. 1 incorporated into a tire building drum 102. The tire building drum 102 is rotatably mounted on a central drive shaft 104. The tire building drum 102 includes a left hand side 106 and a right hand side 108 joined together by a center section 110. The center deck assembly 100 is disposed in the center section 110 of the tire building drum 102.

Figure 2:
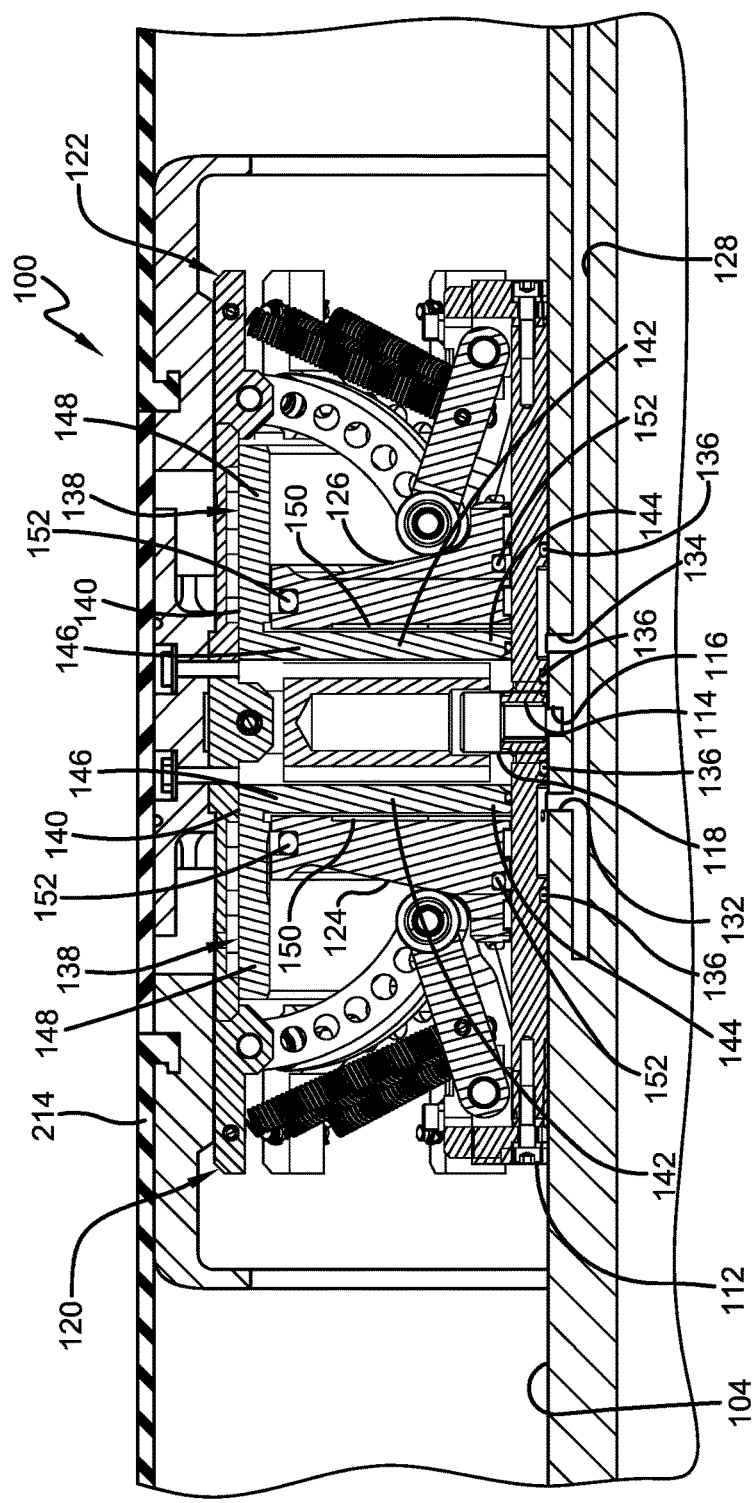
FIG. 2 is an enlarged cross-sectional view of the area in FIG. 1 that is designated as "See FIG. 2"

With additional reference to FIG. 2, the center deck assembly 100 seats on and is secured to the central drive shaft 104. More particularly, the center deck assembly 100 includes a hub 112 that seats on the central drive shaft and is formed with at least one opening 114 that aligns with an opening 116 formed in the drive shaft 104. A mechanical fastener or pin 118 extends through the aligned openings 114 and 116 to secure the hub 112 to the shaft 104.

The center deck assembly 100 includes a left hand side 120 and a right hand side 122. The left hand side 120 includes a left piston 124 and the right hand side 122 includes a right piston 126. At least one axially-extending port 128 is formed in a wall 130 of the central drive shaft 104 and is in fluid communication with each piston 124 and 126 through respective radially-extending ports 132 and 134 formed in the wall of the drive shaft. A seal of the fluid communication between the axial port 128 formed in the drive shaft 104 and the center deck assembly 100 is provided by sealing members such as O-rings 136. With this structure, the center deck assembly 100 efficiently receives fluid flow through the central drive shaft 104, without the need for a separate conduit.

Each one of the left piston 124 and the right piston 126 extends circumferentially in the tire building drum 102 (FIG. 1) about the hub 112. Because the left piston 124 and right piston 126 are similar to one another in structure and function, only the left piston will be described below for the purpose of convenience, with the understanding that the description also applies to the right piston. The piston 124 seats in a cylinder 138, which is formed by the hub 112 and a frame 140. The frame 140 includes a radially-extending member 142, which has a radially inward end 144 that seats on the hub 112 and an axially extending member 148 that extends parallel to the hub from a radially outward end 146 of the radially extending member.

A cavity 150 is formed between the piston 124 and the cylinder 138 adjacent the radially-extending frame member 142. Sealing members 152 provide a seal between the piston 124 and the cylinder 138. For example, sealing members 152 may be an O-ring formed of polymer or an elastomer, a gasket or other sealing ring known to those skilled in the art, or any combination thereof. When compressed air flows through the axially-extending port 128, the air is communicated to the cavity 150, which urges the piston 124 to move axially away from the radially-extending frame member 142.

Figure 5:
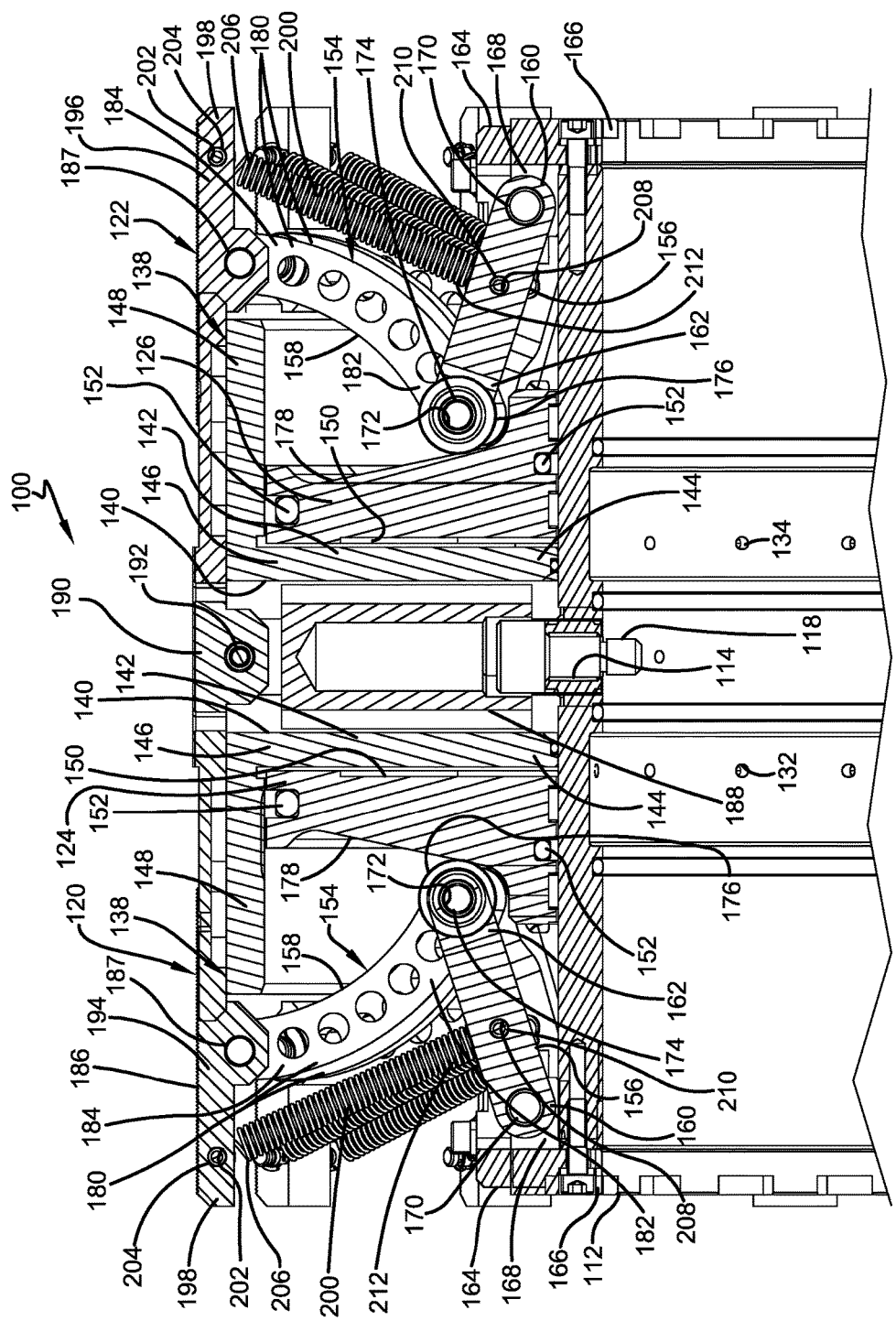
FIG. 5 is an enlarged cross-sectional view of a portion of the center deck assembly shown in FIG. 1 in a contracted state.
Figure 6:
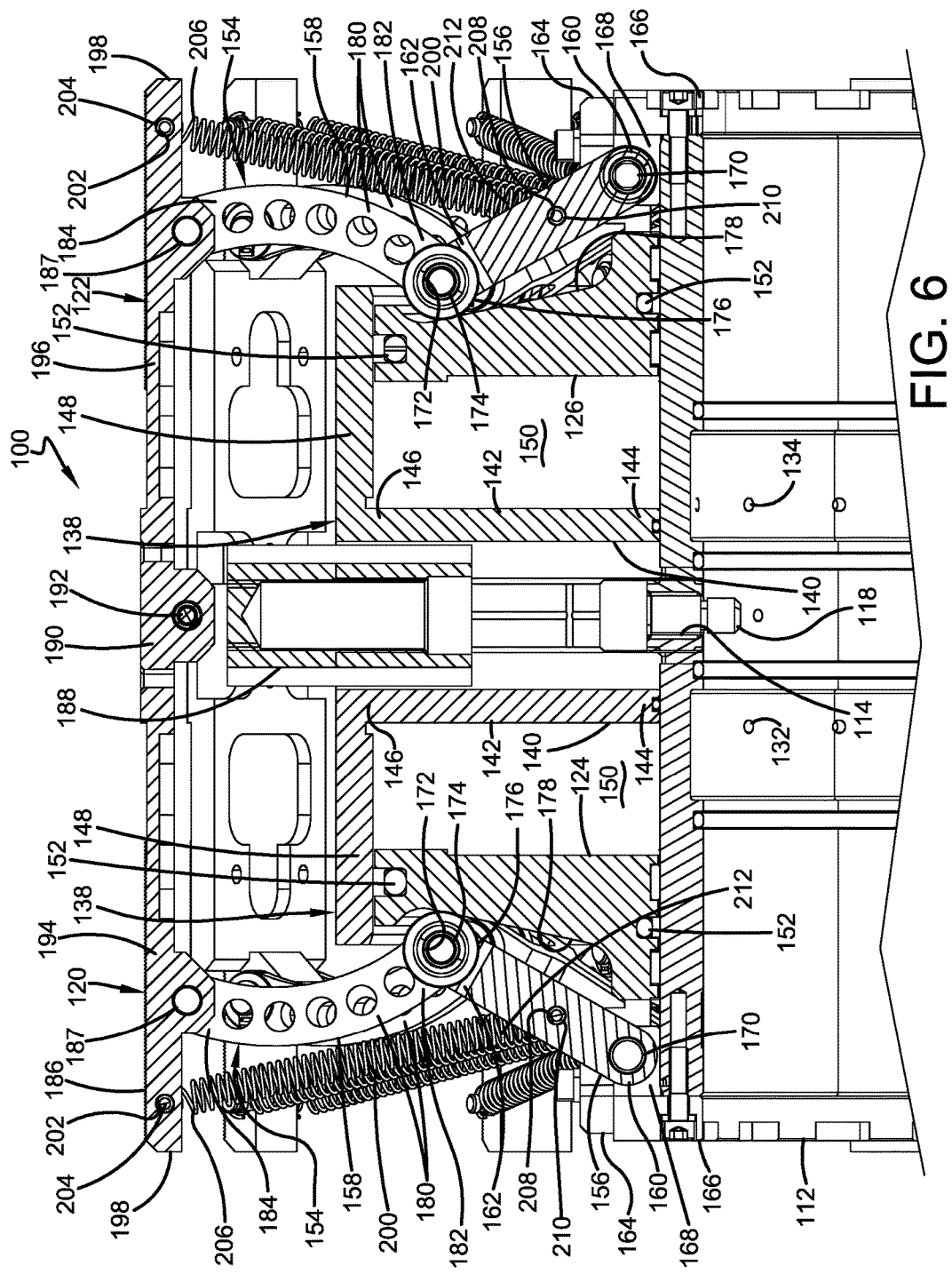
FIG. 6 is an enlarged cross-sectional view of a portion of the center deck assembly shown in FIG. 1 in an expanded state.

Turning now to FIGS. 5 and 6, a linkage 154 is disposed axially outwardly of the piston 124. Because the linkage 124 that is axially outwardly of the left piston 124 and the linkage that is axially outwardly of the right piston 126 are similar to one another in structure and function, only the linkage that is axially outwardly of the left piston will be described below for the purpose of convenience, with the understanding that the description also applies to the linkage that is axially outwardly of the right piston.

The linkage 154 includes a radially inward link 156 and a radially outward link 158 that are pivotally interconnected to one another. More particularly, the radially inward link 156 is formed with a Y-shaped configuration and includes an axially outward end 160 and an axially inward end 162. A mechanical stop 164 is rigidly secured to an axially outward end 166 of the hub 112 and a thrust block 168 is rigidly attached to the mechanical stop and the hub. The axially outward end 160 of the radially inward link 156, which is the base of the Y-shaped configuration, is pivotally attached to the thrust block by a pin connection 170.

The axially inward end 162 of the radially inward link 156, which is the upper end of the Y-shaped configuration, is formed with aligned openings 172. A shaft 174 is received in and extends between the openings 172 and a roller 176 rotatably seats on the shaft. The axially outward surface of the piston 124 is formed with a bearing surface 178 that angles axially inwardly as it extends radially outwardly. The roller 176 engages and rolls on the bearing surface 178 during operation of the center deck assembly 100, as will be described in greater detail below.

The radially outward link 158 includes a pair of parallel link segments 180, each one of which in turn includes a radially inward end 182 that is pivotally attached to the shaft 174 adjacent the radially inward link 156. Each link segment 180 also includes a radially outward end 184 that is pivotally connected to the segment bar 186 by a pivot connection 187. Each link segment 180 preferably is curved to enable it to clear the frame axially extending member 148 of the frame during operation of the center deck assembly.

A guide post 188 is disposed between the left piston 124 and the right piston 126. More particularly, the guide post 188 is located between and adjacent the radially-extending member 142 of the frame 140 of the left piston and the radially-extending member of the frame of the right piston 126. The guide post 188 is pivotally connected to a center portion 190 of the segment bar 186 by a pivot connection 192.

Figure 3:
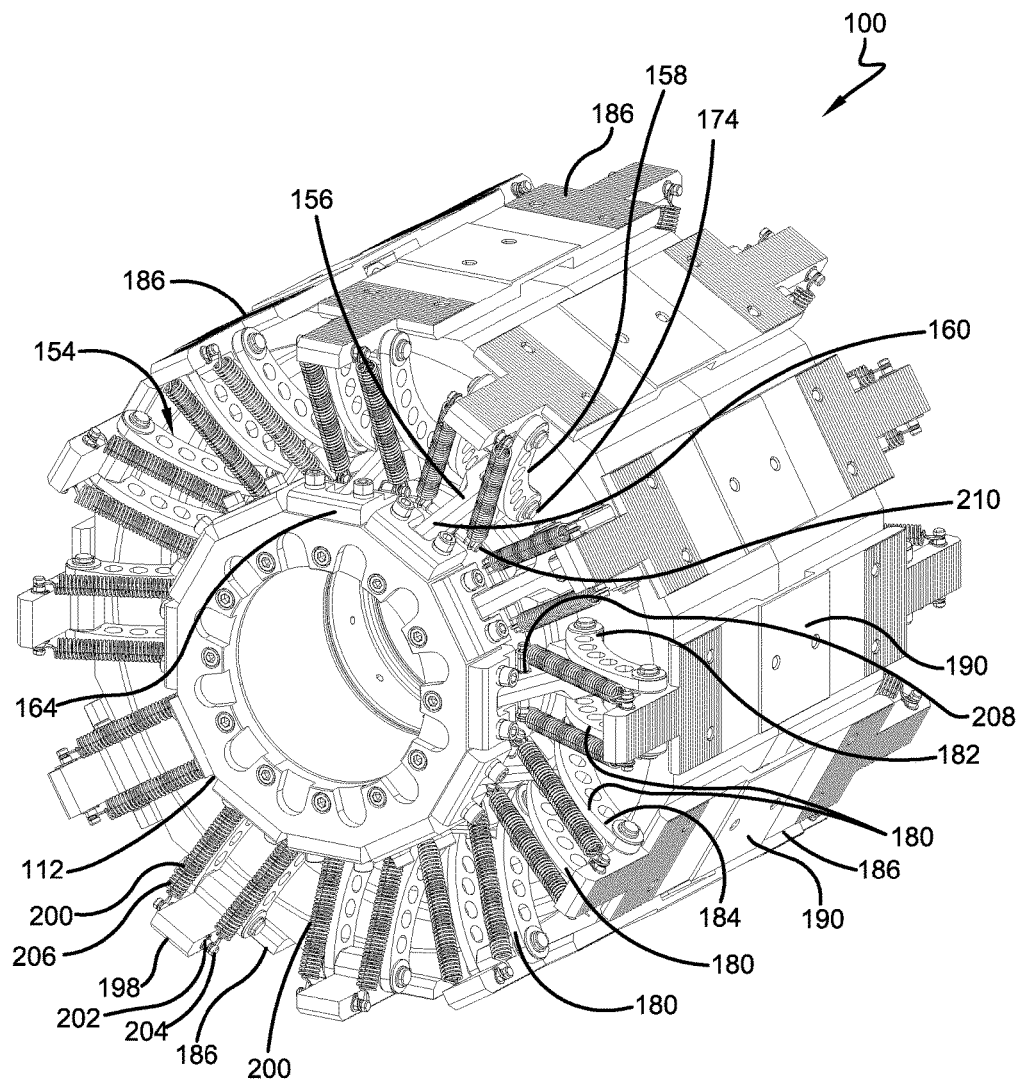
FIG. 3 is a perspective view of the center deck assembly shown in FIG. 1 in a contracted state.

As shown in FIG. 3, a plurality of segment bars 186 are disposed about the circumference of the center deck assembly 100. Each segment bar 186 includes a left side 194 that is to the left of the center 190 and a right side 196 that is to the right of the center. The left side 194 of each segment bar 186 is disposed radially outwardly of, and in radial alignment with, the left piston 124. The right side 196 is disposed radially outwardly of, and in radial alignment with, the right piston 126. Because the left side 194 of the segment bar 186 and the right side 196 of the segment bar are similar to one another in structure and function, only the left side of the segment bar will be described below for the purpose of convenience, with the understanding that the description also applies to the right side of the segment bar.

Each segment bar 186 includes a pair of opposing axially outward ends 198 and a pair of springs 200 are operably connected to each segment bar axially outward end. More particularly, each side edge of the axially outward end 198 of the segment bar 186 is formed with an opening 202 that receives a pin 204. A radially outward end 206 of each spring 200 engages a respective one of the pins 204. The radially inward link 156 of the linkage 154 is formed with an opening 208 that receives a pin 210 and a radially inward end 212 of each spring 200 engages a respective one of the pins. In this manner, each spring 200 extends between the axially outward end 198 of the segment bar 186 and the radially inward link 156 of the linkage 154.

With reference to FIGS. 3 and 5, when the center deck assembly 100 is in a collapsed or contracted state, the springs 200 pull the ends 198 of the segment bars 186 radially inwardly toward their respective radially inward links 156 of the linkages 154. Each segment bar 186 is drawn radially inwardly until it seats against the axially-extending member 148 of the frame 140.

Figure 4:
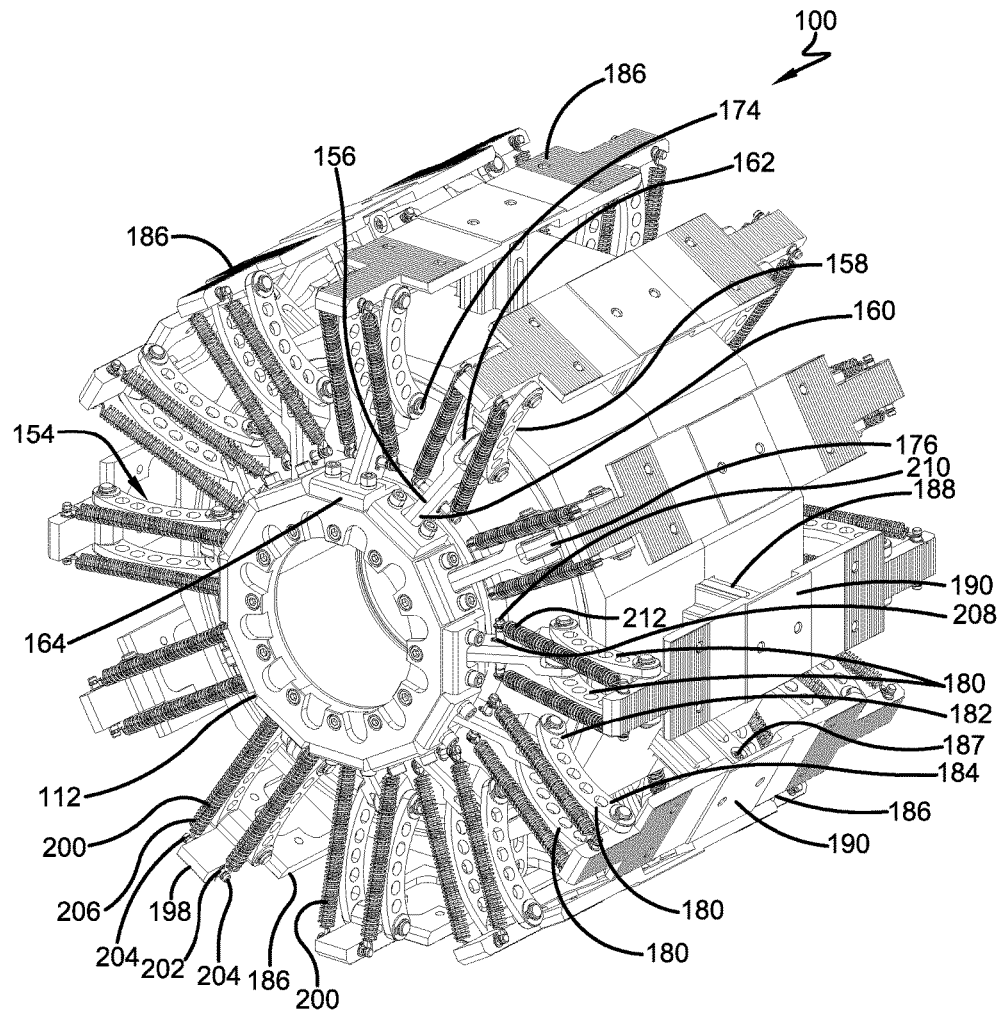
FIG. 4 is a perspective view of the center deck assembly shown in FIG. 1 in an expanded state.

Turning now to FIGS. 4 and 6, to expand the center deck assembly 100, a flow of compressed air through the axially-extending port 128 (FIG. 2) is actuated by a controller or control system (not shown). The air flows through the radially-extending ports 132 and 134 into each respective cavity 150. The air pressure in each cavity 150 overcomes the bias of the respective springs 200, urging each piston 124 and 126 in an axially outwardly direction. As each piston 124 and 126 moves axially outwardly, the piston bearing surface 178 acts on each respective roller 176, forcing the roller to roll in a radially outward direction. As the roller 176 moves along the bearing surface 178 of the piston 124 and 126 in a radially outward direction, the angle between the radially inward link 156 and the radially outward link 158 of the linkage 154 increases. As the angle increases, the linkage 154 urges each respective side 194 and 196 of the segment bar 186 in a radially outward direction until the radially outward limit of each segment bar dictated by the mechanical stop 164 is reached.

The pivot connection 192 of the guide post 188 to the center 190 of the segment bar 186 balances the respective movement between the left side 194 and the right side 196 of each segment bar to prevent binding. Binding of the center deck assembly 100 during operation is further minimized because the left piston 124 and the right piston 126 have equal areas and move in opposite directions, which results in a zero net force on the guide post 188. This structure of the center deck assembly 100 enables the segment bars 186 to expand to a crown height of up to 2.25 inches, while maintaining mechanical advantage. More particularly, the scissor-lever mechanism of the linkage 154 provides a large force amplification, which is known in the art as mechanical advantage, to expand the segment bars 186. By enabling each piston 124 and 126 to act on a respective portion of each segment bar 154 in a diagonal manner, the structure of each linkage 154 reduces the amount of force that is needed to expand the center deck assembly. It is to be understood that an elastomeric or polymeric sleeve 214 (FIGS. 1 and 2) typically is disposed on the outside of the tire building drum 102. The sleeve 214 typically includes multiple pieces and is shown in FIG. 1 as including three (3) pieces. As the segment bars 186 extend or expand radially outwardly, they expand the sleeve 214 and thus the carcass of the tire being built.

With reference to FIGS. 3 and 5, to retract the segment bars 186 the flow of compressed air through the axially extending port 128 (FIG. 2) is stopped. Optionally, a vacuum may be introduced into the axially extending port 128. Once the flow of compressed air ceases, the force of the mechanical springs 200 and any vacuum that is applied urge the angle between the radially inward link 156 and the radially outward link 158 of the linkage 154 to decrease. This decreasing angle causes the roller 176 to urge each piston 124 and 126 in an axially inward direction. As the pistons 124 and 126 move inwardly, the roller 176 rolls in a radially inward direction along the bearing surface 178 and the segment bar 186 retracts radially inwardly until it seats against the axially-extending member 148 of the frame 140.

In this manner, the center deck assembly 100 of the present invention provides a compact structure that optimizes the stroke of the segment bars 186 while maintaining mechanical advantage. As described above, the linkages 154 for each segment bar 186 are scissor-lever mechanisms that act similar to a scissors jack, in that the mechanical advantage increases as the stroke increases. In addition, the conical shape of each piston bearing surface 178 provides further mechanical advantage to the linkage 154. Such mechanical advantage is important, as the required force to stretch the green tire, bladders and center sleeve increases with increasing diameter.

It is to be understood that the positive mechanical stops 164 limit the stroke of each piston 124 and 126 and determine the expanded crown diameter. By adjusting the position of the mechanical stops 164, the radial expansion of the center deck assembly 100 is controlled. For example, the mechanical stops may be positioned to enable a crown height of about 1.5 inches or a crown height of up to about 2.25 inches. Because the mechanical stops 164 are located at the axial ends of the center deck assembly 100, they can be easily changed to enable different crown heights to be achieved. It is also to be understood that the center deck assembly 100 of the present invention separates the bead locking and crowning functions, allowing them to be operated independently if desired.

The present invention also includes a method of forming a tire using a tire building drum 102 that incorporates the center deck assembly 100. The method includes steps in accordance with the description that is presented above and shown in FIGS. 1 through 6.

It is to be understood that the structure of the above-described center deck assembly 100 may be altered or rearranged, or components known to those skilled in the art omitted or added, without affecting the overall concept or operation of the invention. In addition, the center deck assembly 100 of the present invention may be employed with types of tire building drums 102 other than those shown and described herein.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A center deck assembly for a tire building drum, the tire building drum being rotatably mounted on a central drive shaft and including a center section, the center deck assembly being disposed in the center section of the drum, the center deck assembly comprising:
   a hub seating on and being secured to the central drive shaft, the hub cooperating with a frame to form a cylinder;
   a piston extending circumferentially in the tire building drum about the hub, the piston seating in the cylinder and being contained in the cylinder;
   a plurality of segment bars being disposed about the circumference of the center deck assembly;
   the piston being operably connected to the segment bars by a plurality of linkages, wherein each of the linkages comprises a scissor-lever mechanism, each of the linkages including a radially inward link and a radially outward link that are pivotally interconnected; and
   a roller disposed on each linkage at the pivotal interconnection between the radially inward link and the radially outward link, wherein the roller engages a bearing surface formed on an axially outward surface of the piston, in which the bearing surface is formed with a conical shape that angles axially inwardly as it extends radially outwardly.

2. The center deck assembly of claim 1, wherein the central drive shaft is formed with at least one axially-extending port, the port being in fluid communication with the piston.

3. The center deck assembly of claim 1, wherein a cavity is formed between the piston and the cylinder adjacent a portion of the frame, whereby when compressed air flows into the cavity the piston is urged axially outwardly.

4. The center deck assembly of claim 1, wherein the linkages are disposed axially outwardly of the piston.

5. The center deck assembly of claim 1, wherein:
an axially outward end of the radially inward link is pivotally attached to a thrust block;
an axially inward end of the radially inward link is formed with aligned openings;
a shaft is received in the openings; and
the radially outward link includes a pair of parallel link segments, each one of which includes a radially inward end that is pivotally attached to the shaft.

6. The center deck assembly of claim 5, wherein each link segment includes a radially outward end that is pivotally connected to a portion of one of the segment bars.

7. The center deck assembly of claim 1, wherein the piston is a first piston, further comprising a second piston spaced apart from the first piston.

8. The center deck assembly of claim 7, wherein a guide post is disposed between the pistons.

9. The center deck assembly of claim 8, wherein the guide post is pivotally connected to a center of one of the segment bars.

10. The center deck assembly of claim 1, wherein each segment bar includes opposing axially outward ends, and a pair of springs are operably connected to each of the segment bar axially outward ends and to a selected linkage.

11. The center deck assembly of claim 1, wherein a mechanical stop is rigidly secured to an axially outward end of the hub, wherein the mechanical stop sets a crown height of the center deck.

12. The center deck assembly of claim 1, wherein a plurality of the linkages is disposed at least partially axially and radially within the cylinder formed by the hub and the frame when the center deck assembly is in a retracted state.

13. The center deck assembly of claim 12, wherein the radially outward link of each linkage is formed with a curved shape.

* * * * *